(12) United States Patent
Hertel et al.

(10) Patent No.: US 7,220,055 B2
(45) Date of Patent: May 22, 2007

(54) AIR BEARING HAVING UNITARY HOUSING

(75) Inventors: Richard J. Hertel, Boxford, MA (US); Jeffery E. Krampert, Dover, NH (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 96 days.

(21) Appl. No.: 11/029,943

(22) Filed: Jan. 5, 2005

(65) Prior Publication Data
US 2006/0147136 A1    Jul. 6, 2006

(51) Int. Cl.
*F16C 17/02* (2006.01)
(52) U.S. Cl. .................................... 384/119
(58) Field of Classification Search ............... 384/114, 384/119, 113, 117, 120
See application file for complete search history.

(56) References Cited

U.S. PATENT DOCUMENTS 4,573,808 A * 3/1986 Katayama .................. 384/114
5,073,037 A * 12/1991 Fujikawa et al. ........... 384/120

* cited by examiner

*Primary Examiner*—Lenard A. Footland

(57) ABSTRACT

An air bearing including a unitary, i.e., single piece, housing, which removes the need for an insert, is disclosed. The air bearing may include a shaft opening longitudinally extending through the housing for receiving the shaft; a plurality of passages that longitudinally extend into the housing for communicating a gas; a set of a plurality of nozzle seat openings, each nozzle seat opening extending from the shaft opening and intersecting one of the passages; and a nozzle positioned in each nozzle seat opening at a distance from the shaft opening for injecting the gas into the shaft opening to support the shaft. The air bearing allows for contact of the shaft to the shaft opening in the housing without damage, no leakage, and easier and more cost-effective manufacturability.

16 Claims, 5 Drawing Sheets ial Field

The present invention relates generally to air bearings, and more particularly, to an air bearing including a unitary housing for supporting a shaft using a gas.

2. Related Art

FIG. 1 illustrates a conventional air bearing 8 including a housing 10 for supporting a shaft 12. Housing 10 includes an outer body 14 and an insert 16. Pressurized gas is delivered to support shaft 12 via a passage 18 that extends though body 14 and insert 16. Conventional air bearings 8 suffer from a number of disadvantages. First, conventional air bearings use inserts 16 that do not allow touching of shaft 12 to the insert. For example, where insert 16 is made of a soft material such as bronze, touching of shaft 12 to insert 16 may cause material transfer to shaft 12 with the bronze or debris to be released within the system, and/or galling of shaft 12. Second, manufacturing of conventional air bearings requires assembly of multiple parts of housing 10, i.e., outer body 14 and insert 16, which adds complexity to the process. In particular, inserting of insert 16 into outer body 14 requires interference conditions, which leads to yield loss issues where insert 16 is made of a brittle material such as graphite. Third, insert 16 may leak to the extent that collapse of insert 16 under normal operating pressures can occur. For example, graphite inserts 16 tend to collapse when the pressure is turned on.

In view of the foregoing, there is a need in the art for an air bearing that does no suffer from the problems of the related art.

SUMMARY OF THE INVENTION

The invention includes an air bearing including a unitary, i.e., single piece, housing, which removes the need for an insert. The air bearing may include a shaft opening longitudinally extending through the housing for receiving the shaft; a plurality of passages that longitudinally extend into the housing for communicating a gas; a set of a plurality of nozzle seat openings, each nozzle seat opening extending from the shaft opening and intersecting one of the passages; and a nozzle positioned in each nozzle seat opening at a distance from the shaft opening for injecting the gas into the shaft opening to support the shaft. The air bearing allows for contact of the shaft to the shaft opening in the housing without damage, no leakage, and easier and more cost-effective manufacturability.

A first aspect of the invention is directed to an air bearing for supporting a shaft, the bearing comprising: a single piece housing; a shaft opening longitudinally extending through the housing for receiving the shaft; a plurality of passages that longitudinally extend into the housing for communicating a gas; a set of a plurality of nozzle seat openings, each nozzle seat opening extending from the shaft opening and intersecting one of the passages; and a nozzle positioned in each nozzle seat opening at a distance from the shaft opening for injecting the gas into the shaft opening to support the shaft.

A second aspect of the invention includes an air bearing for supporting a shaft, the bearing comprising: a unitary housing; a shaft opening longitudinally extending through the housing for receiving the shaft; a plurality of passages that longitudinally extend into the housing for communicating a gas; a manifold coupled to the plurality of passages; a plurality of sets of a plurality of nozzle seat openings, each nozzle seat opening extending from the shaft opening to an outer surface of the housing and intersecting one of the passages, the plurality of sets longitudinally spaced along the housing; and a nozzle positioned in each nozzle seat opening at a distance from the shaft opening for injecting the gas into the shaft opening to support the shaft.

A third aspect of the invention is directed to an air bearing for supporting a shaft, the bearing comprising: a single piece housing including a plurality of passages for supplying a gas to support a shaft in a shaft opening longitudinally extending through the housing.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION

Figure 1:
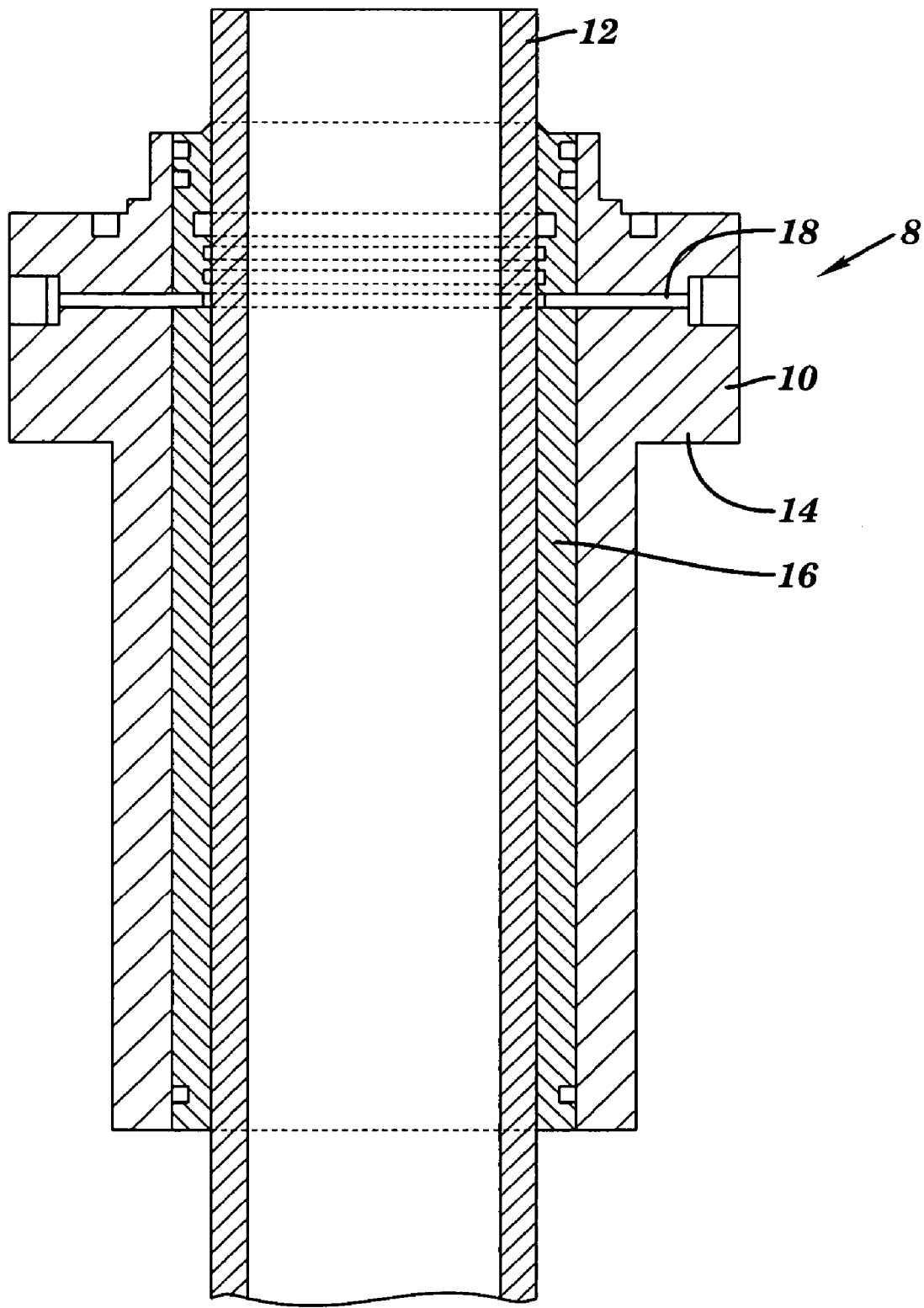
FIG. 1 shows a cross-sectional view of a conventional air bearing.
Figure 2:
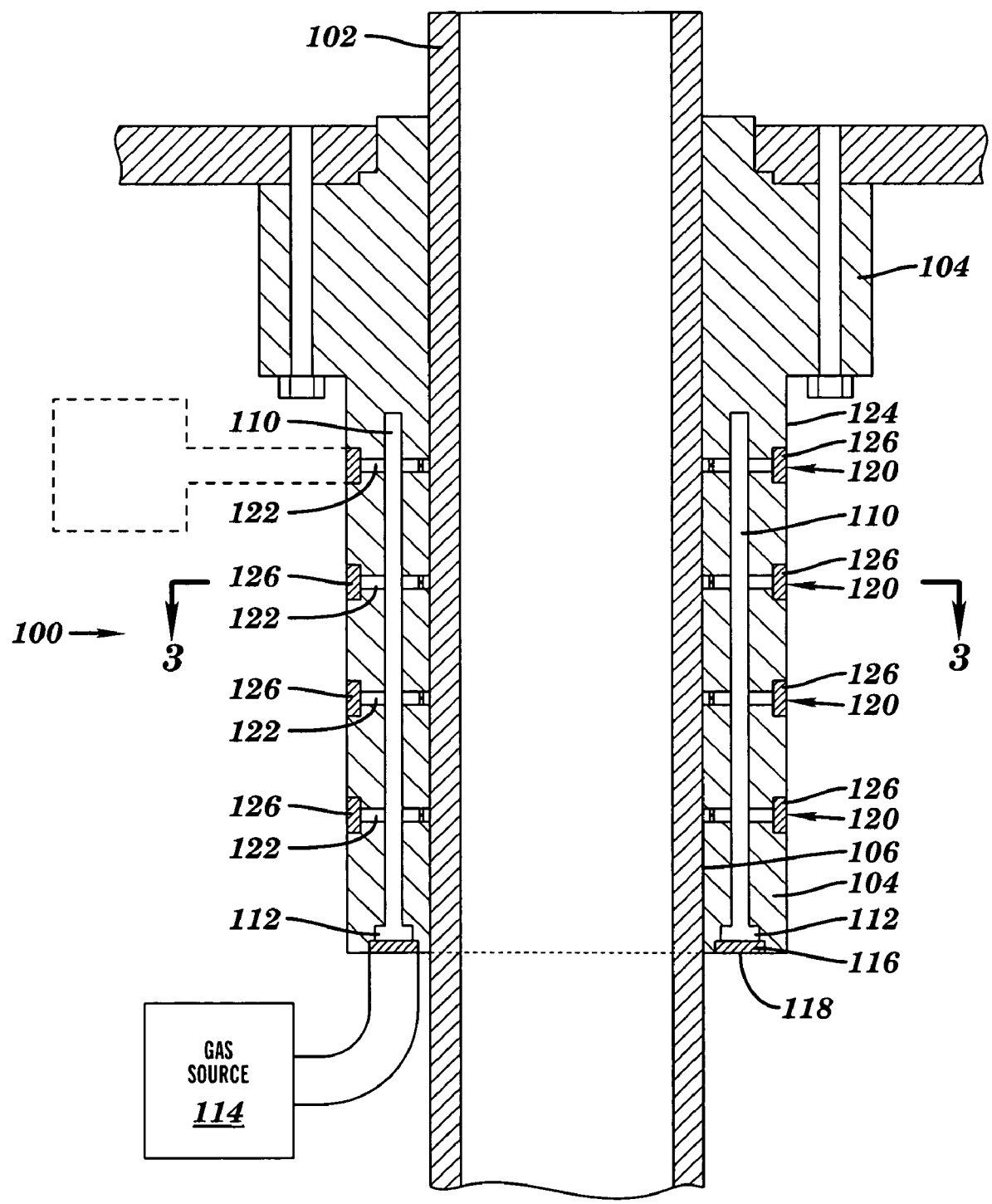
FIG. 2 shows a cross-sectional view of an air bearing according to the invention.
Figure 3:
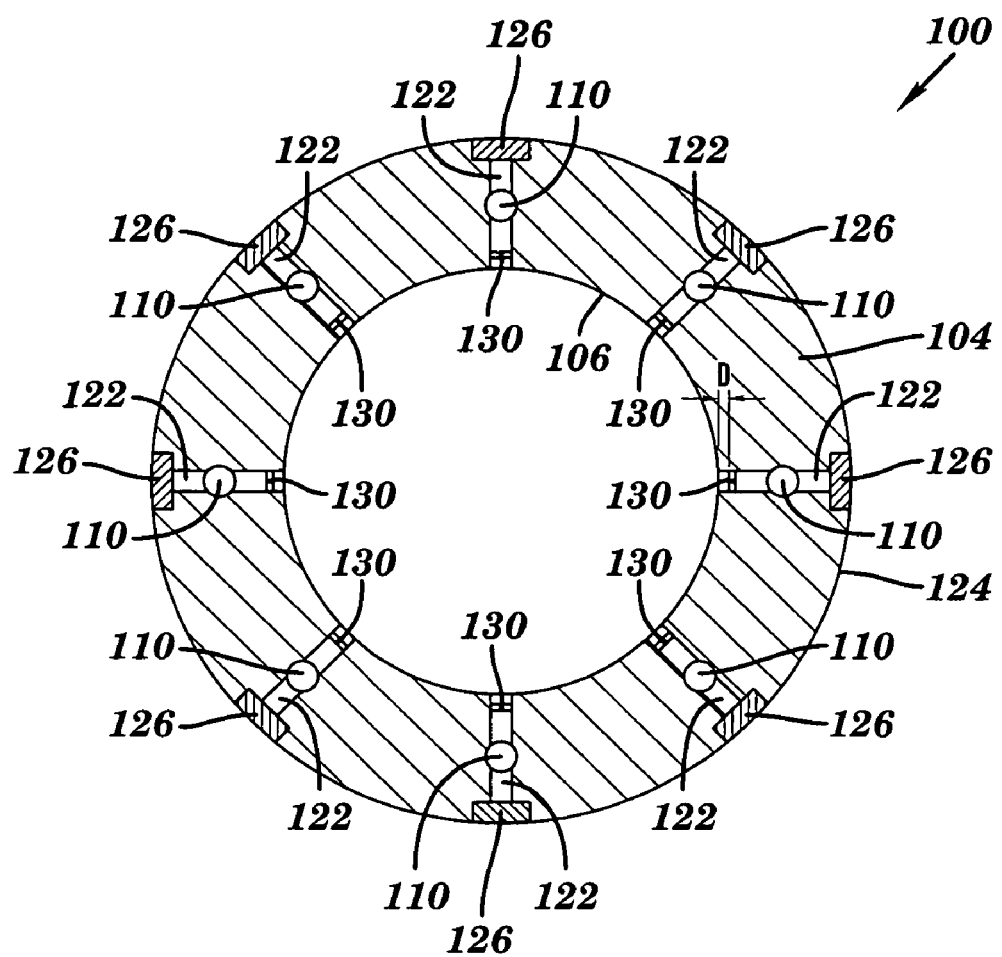
FIG. 3 shows a cross-sectional view of the air bearing of FIG. 2 along line 3—3.

With reference to the accompanying drawings, FIGS. 2–3 show an air bearing 100 for supporting a shaft 102 (FIG. 2 only) according to the invention. The term "air bearing," as used herein, is not meant to limit the gas used with the bearing to air, but to comport with the conventional terminology for these type bearings. Air bearing 100 includes a unitary member, i.e., single piece, housing 104 having a shaft opening 106 longitudinally extending therethrough for receiving shaft 102 (FIG. 2 only).

Housing 104 also includes a plurality of passages 110 that longitudinally extend into the housing for communicating a gas. In one embodiment, passages 110 are communicatively coupled to a manifold 112 (FIG. 2 only) for distributing gas supplied to manifold 112 (or one of passages 110) by a gas source 114, e.g., a pneumatic pump, compressor, etc. Manifold 112 extends in a substantially curved fashion about an end of housing 104 to which passages 110 extend. Openings 116 (if any) in manifold 112 and/or passages 110 not required for communication of gas are sealed with plug(s) 118. Plug 118 may be seated in any now known or later developed fashion, e.g., welding, threaded couplings, etc.

Housing 104 also includes a set 120, and preferably, a number of longitudinally spaced sets 120, of nozzle seat openings 122 therewithin. FIG. 3 shows a cross-sectional view of one set 120 of nozzle seat openings 122. Each nozzle seat opening 122 extends from shaft opening 106 and intersects one of passages 110 such that gas supplied to each passage 110 also supplies at least one nozzle seat opening 122. In one embodiment, each nozzle seat opening 122 extends to an outer surface 124 of housing 104 and includes a seal 126 therein adjacent outer surface 124 to seal the opening. Seals 126 may be seated in any now known or later developed fashion, e.g., welding, threaded couplings, etc.

Figure 4:
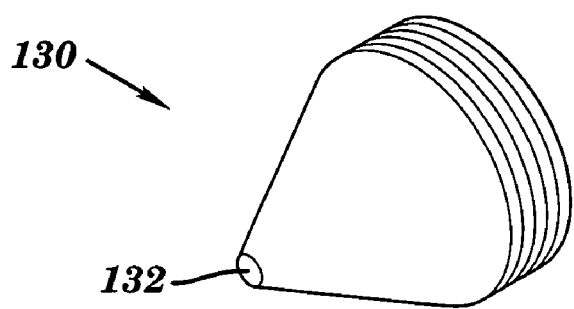
FIG. 4 shows a perspective view of a nozzle for use in the air bearing of FIGS. 2–3.

As shown in FIG. 3, a nozzle 130 is positioned in each nozzle seat opening 122 at a distance (D) from shaft opening 106 for injecting the gas into shaft opening 106 to support shaft 104 (FIG. 2 only). As shown best in FIG. 4, each nozzle 130 includes an aperture 132 through which gas passes into shaft opening 106. Distance D is preferably as small as possible to provide for expansion of the gas in between the end of nozzle 130 and shaft 102 (FIG. 2). Nozzles 130 are seated in nozzle seat openings 122 in any now known or later developed fashion, e.g., by threaded seating (FIG. 4), welding, etc. Each nozzle seat opening 122, and hence each nozzle 130, is diametrically opposed to another nozzle seat opening 122 about shaft opening 106 so as to provide balanced loading. In operation, gas is supplied by gas source 114 to passages 110 and/or nozzle seat openings 122 and is delivered to shaft opening 106 by nozzles 130 to support shaft 102.

Returning to FIG. 2, it is discernible that air bearing 100 provides shaft 106 immediately adjacent shaft opening 106. That is, no insert is required. In one embodiment, housing 104 includes stainless steel and shaft 106 includes at least one of: stainless steel, hardened stainless steel, chrome and nickel. As a result, air bearing 100 allows for contact of shaft 102 to shaft opening 106 in housing 104 without damage. Housing 104 is manufactured with high tolerances to shaft 102 such that no leakage occurs. In addition, since housing 104 is a unitary member, it is easier and more cost-effective manufacture.

Figure 5:
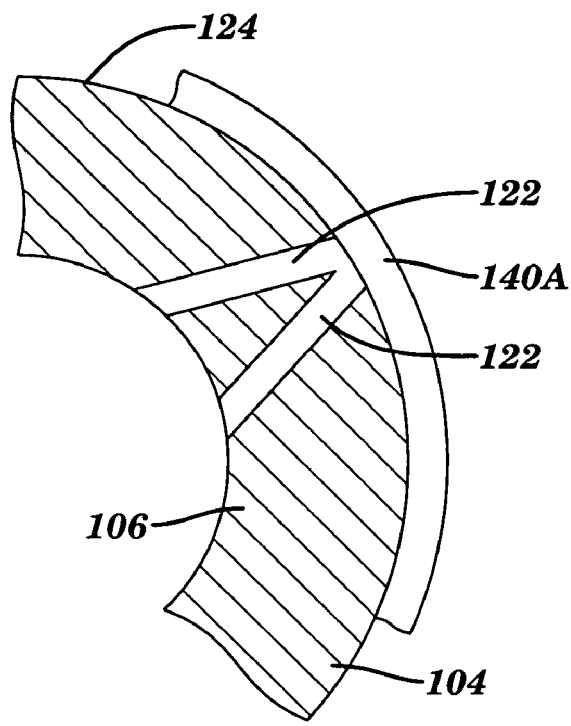
FIG. 5 shows a partial cross-sectional view of an alternative embodiment of the air bearing of FIG. 2.
Figure 7:
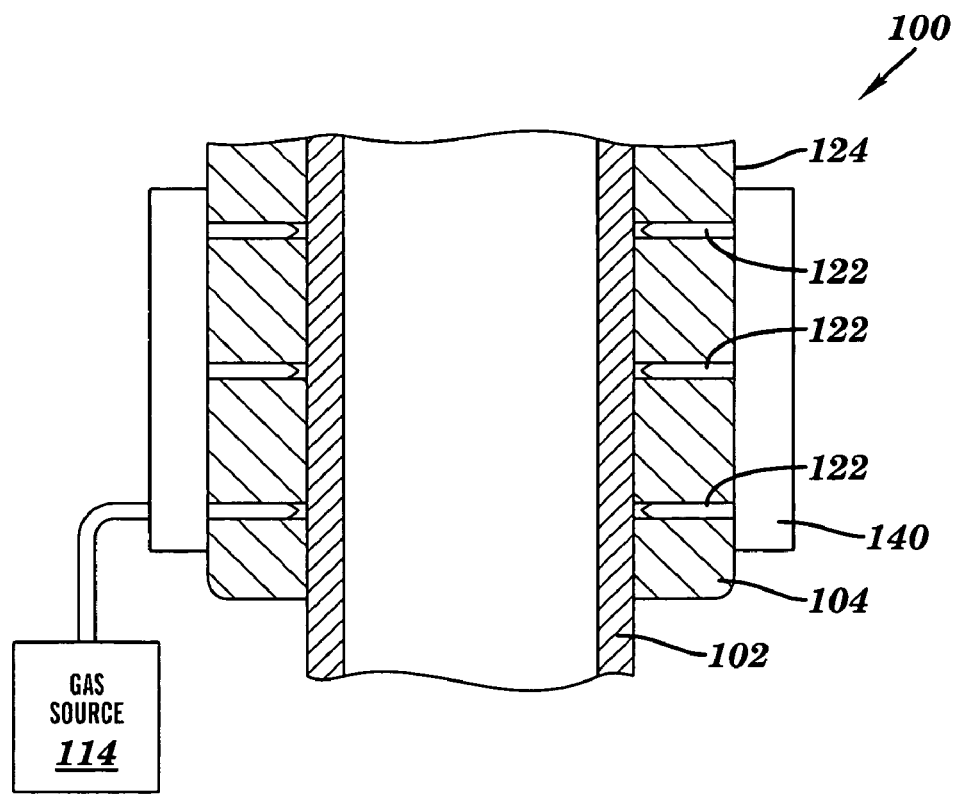
FIG. 7 shows a cross-sectional view of another alternative embodiment of the air bearing.
Figure 6:
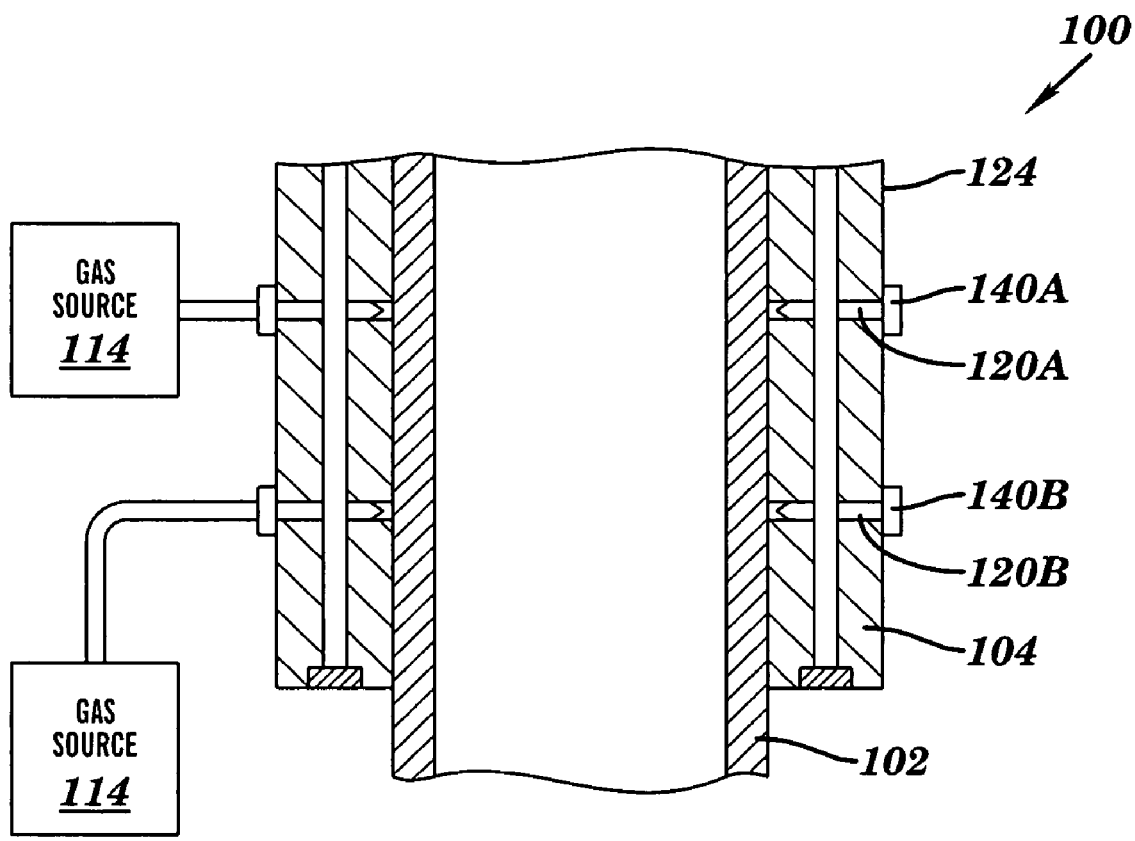
FIG. 6 shows a cross-sectional view of another alternative embodiment of the air bearing.

Turning to FIGS. 5–7, alternative embodiments of air bearing 100 are illustrated. In the above-described embodiment, shown in FIG. 3, each nozzle seat opening 122 extends substantially radially from shaft opening 106. However, other arrangements are also within the scope of the invention. For example, in one alternative embodiment, shown in FIG. 5, at least two nozzle seat openings 122 may extend to the same location at outer surface 124 of housing 104, which makes formation of nozzle seat openings 122, e.g., by drilling, easier. In this case, as shown in FIG. 6, a manifold 140A, 140B for each set 120A, 120B of nozzle seat openings 120 may be positioned adjacent to outer surface 124 of housing 104. Manifold 140A, 140B extend about outer surface 124 of housing 104. separate gas source 114 can be provided for each manifold to provide different pressures, if desired. Although not shown, this embodiment may also allow for elimination of at least parts of passages 110 since each set 120A, 120B of nozzle seat openings is separately supplied with gas, i.e., manifold 112 (FIG. 2) is no longer necessary. In another alternative embodiment, shown in FIG. 7, a single manifold 142 positioned about outer surface 124 of housing 104 for delivery of gas to each nozzle seat opening 122 may be provided. In this case, passages 110 (FIG. 2) may be eliminated. Returning to FIG. 2, in another alternative embodiment, a source of gas (shown in phantom) may be communicatively coupled to at least one of the nozzle seat openings 122 along a passage 110, rather than manifold 112 or manifolds 140A, 140B (FIG. 6). In this case, gas would pass through passage 110 to other nozzle seat openings 122.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. An air bearing for supporting a shaft, the bearing comprising:
   a single piece housing;
   a shaft opening longitudinally extending through the housing for receiving the shaft;
   a plurality of passages that longitudinally extend into the housing for communicating a gas;
   a set of a plurality of nozzle seat openings, each nozzle seat opening extending from the shaft opening and intersecting one of the passages wherein each nozzle seat opening extends to an outer surface of the housing and includes a seal therein adjacent the outer surface of the housing; and
   a nozzle positioned in each nozzle seat opening at a distance from the shaft opening for injecting the gas into the shaft opening to support the shaft.

2. The bearing of claim 1, wherein each nozzle seat opening is diametrically opposed to another nozzle seat opening about the shaft opening.

3. The bearing of claim 1, wherein at least two nozzle seat openings in the set extends to the same location at the outer surface of the housing.

4. The bearing of claim 1, wherein a source of gas is communicatively coupled to at least one of the nozzle seat openings.

5. The bearing of claim 1, further comprising a manifold coupled to the plurality of passages.

6. The bearing of claim 5, wherein a source of gas is communicatively coupled to the manifold for feeding gas to each of the plurality of passages.

7. The bearing of claim 1, wherein the shaft is immediately adjacent the shaft opening.

8. The bearing of claim 1, wherein the housing includes a unitary member.

9. The bearing of claim 1, further comprising a plurality of sets of a plurality of nozzle seat openings longitudinally spaced within the housing.

10. The bearing of claim 9, further comprising a manifold for each set of nozzle seat openings positioned adjacent to an outer surface of the housing.

11. The bearing of claim 9, further comprising a single manifold positioned about an outer surface of the housing for delivery of gas to each nozzle seat opening.

12. The bearing of claim 1, wherein each nozzle seat opening extends substantially radially from the shaft opening.

13. The bearing of claim 1, wherein the housing includes stainless steel and the shaft includes at least one of: stainless steel, hardened stainless steel, chrome and nickel.

14. An air bearing for supporting a shaft, the bearing comprising:
   a unitary housing;
   a shaft opening longitudinally extending through the housing for receiving the shaft;
   a plurality of passages that longitudinally extend into the housing for communicating a gas;
   a manifold coupled to the plurality of passages;
   a plurality of sets of a plurality of nozzle seat openings, each nozzle seat opening extending from the shaft opening to an outer surface of the housing and intersecting one of the passages, the plurality of sets longitudinally spaced along the housing; and a nozzle positioned in each nozzle seat opening at a distance from the shaft opening for injecting the gas into the shaft opening to support the shaft, wherein each nozzle seat opening includes a seal therein adjacent the outer surface of the housing.

15. The bearing of claim 14, wherein a source of gas is communicatively coupled to one of: at least one of the nozzle seat openings, the manifold for feeding gas to each of the plurality of passages, and at least one of the plurality of passages.

16. The bearing of claim 14, wherein the shaft is immediately adjacent the shaft opening.

* * * * *